Nov. 14, 1967

D. M. HELTON ETAL 3,352,950

ELECTRICAL POTENTIAL METHOD FOR DISPERSION
OF METAL OXIDE MICROSPHERES

Filed Dec. 21, 1966

INVENTORS.
Dennis M. Helton
Raymond G. Wymer

ATTORNEY.

CONDITIONS:
 10 MIL I.D. NOZZLES (7)
 1.5 $\underline{M}$ ThO$_2$ SOL

United States Patent Office 3,352,950
Patented Nov. 14, 1967

3,352,950
ELECTRICAL POTENTIAL METHOD FOR DISPERSION OF METAL OXIDE MICROSPHERES
Dennis M. Helton, Clinton, and Raymond G. Wymer, Oak Ridge, Tenn., assignors to the United States of America as represented by the United States Atomic Energy Commission
Filed Dec. 21, 1966, Ser. No. 603,692
2 Claims. (Cl. 264—.5)

ABSTRACT OF THE DISCLOSURE

The present invention calls for a method for the dispersion of a liquid stream into drops of controlled diameter in an immiscible second liquid. The method involves the application of an electrical potential across an aqueous sol flowing through a capillary nozzle, which is submerged in an organic drying liquid, to effect droplet formation. The drop diameter is a function of the sol charging potential and flow rate.

---

The invention described herein was made in the course of, or under, a contract with the U.S. Atomic Energy Commission.

This invention relates generally to a method for preparing metal oxide microspheres from aqueous sols and more specifically to an electrical potential method for preparing controlled diameter metal oxide microspheres.

In the art, metal oxide microspheres are formed for reactor fuel use by the Sol-Gel process as demonstrated in co-pending applications S.N. 385,813, by Sam D. Clinton et al., filed July 28, 1964, entitled "Process for Preparing Oxide Gel Microspheres from Sols," now Patent No. 3,290,122, issued Dec. 6, 1966, and S.N. 504,267, by Paul A. Haas et al., filed Oct. 23, 1965, entitled "A Method for Preparing Metal Oxide Microspheres," now Patent No. 3,331,898, issued July 18, 1967. The first case deals with a two-fluid nozzle in which sol droplets are formed by introducing the sol into the center of a drying liquid stream which acts as the drive fluid. With such an arrangement, the continuous sol flow is accelerated to the drive fluid velocity and then breaks up by a varicose mechanism to give sol droplets of a uniform size and nature.

The latter case deals with improvements in sol dispersion which permits scale-up and narrower particle size range. In this case, droplets are formed by injecting sol at a controlled rate through one or more inlet orifices into an organic drying liquid stream at an angle to the direction of flow of the organic stream. The emerging sol, by this arrangement, is subjected to a high shearing force created by a velocity gradient maintained in the drying liquid at the orifice and is sheared off into sol droplets.

Although the above cited art has been very successful, especially the latter case which permits scale-up for increased production rates, still further improvement with respect to the particle size control is desirable. Uniform sol droplets are necessary to minimize the amount of waste or recycle material. Uniform sol drops are also necessary for continuous operation of a microsphere-forming column into which the present disperser is placed. For example, oversize drops would fall out immediately without drying and would resol and thus spoil part of the product. Undersize drops would never settle fast enough to fall out and would thus accumulate in the microsphere forming column or would be flushed out and collect on the drying liquid filter.

It is, therefore, an object of this invention to provide a process for preparing gel microspheres from sols with improved droplet size control.

Another object is to provide an electrical atomization process for the production of microspheres from sols.

Briefly, the invention calls for passing a fine sol stream through an electrical field as it is introduced into an organic drying liquid through one or more capillary nozzles. The drop diameter is a function of the charging potential and the flow rate of the liquid to be dispersed. With this process the drop size can be controlled within the range of 50 to 500 microns wherein the applied voltage range is 500 to 2000 volts and the sol flow rate range is 0.2 to 1.2 ml./min. per nozzle.

Other objects and many of the attendant advantages of the present invention will become more readily understood by reference to the following detailed description along with the accompanying drawings, wherein:

FIGURE 1 is a flow diagram of an over-all system incorporating an electrostatic disperser disposed in a sphere forming column which is employed in the preparation of metal oxide microspheres in accordance with this process;

Figure 2:
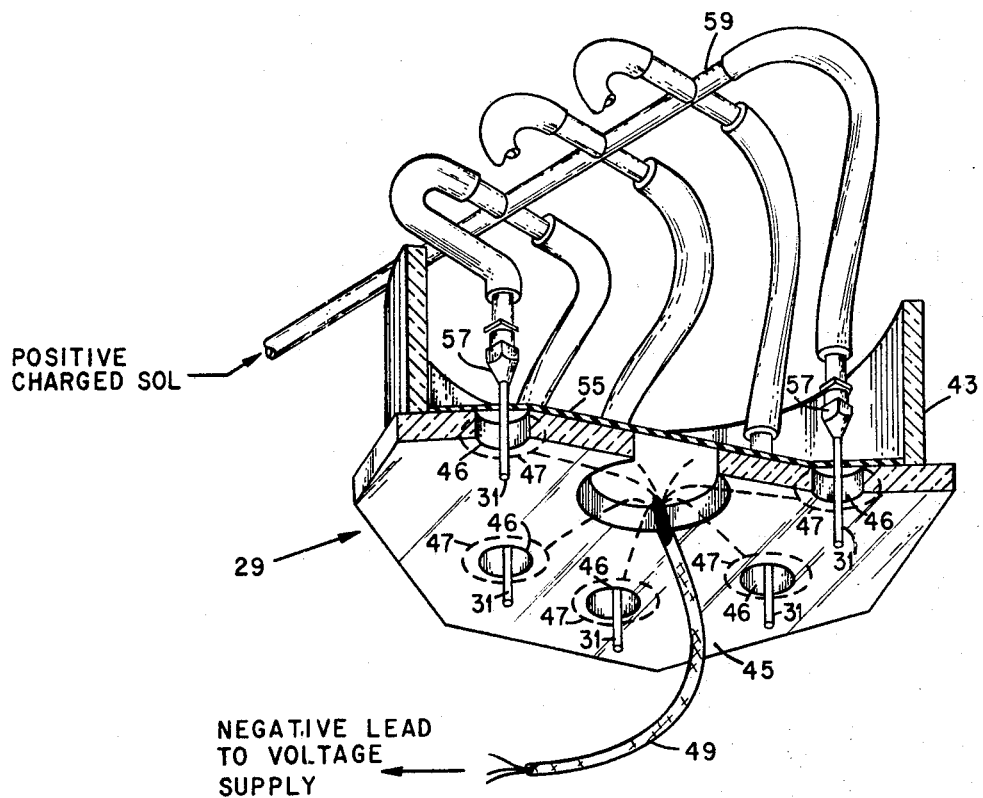
FIGURE 2 is a pictorial view partially in section of an electrostatic disperser according to the present invention.

Referring now to FIGURE 1, there is shown a microsphere forming column 5, which tapers inwardly from the top, comprising a cylindrical disengagement chamber 7 at the top and an enlarged chamber 9 at the bottom. Inlet conduit 11 connects to chamber 9 for passage of an organic drying liquid upward through column 5 and outward through overflow line 13. A product collecting chamber 15 is provided at the bottom of chamber 5 and connects to chamber 9 through a valved line 17. The organic liquid overflowing from chamber 7 through conduit 13 is pumped, by means of pump 19, through a filter 21, a flow regulator 23, and conduit 11 back into chamber 9. A portion of the organic liquid overflows through conduit 25 to a distillation system (not shown) for removing water from the liquid and returns to the system through conduit 27.

Mounted at the top of chamber 7 is an electrostatic disperser 29 which constitutes the preferred embodiment of the present invention and will be discussed in detail with reference to FIGURE 2. Disperser 29 is disposed partially submerged in an organic liquid with nozzles 31 extending downward, wherefrom controlled-diameter, sol microspheres are dispersed into the organic drying liquid, as shown in the drawing. A charged sol flows into disperser 29 from a charged sol reservoir 32 through conduit 33. The aqueous sol is pumped into reservoir 32 by means of pump 35 through a flow regulator 37. In order that a potential may be placed across the sol as it passes through nozzles 31, a variable D.C. voltage supply 39 is connected between an electrode 41 immersed in reservoir 32 and ground rings surrounding nozzles 31 (FIGURE 2).

Referring specifically now to FIGURE 2, a seven-nozzle disperser 29 is shown in detail. A cylindrical housing 43 is affixed to a base plate 45. Plate 45 has a plurality of openings 46, therethrough, each encircled by a ground wire embedded in plate 45 and combined into a common insulated lead 49 in a central opening 51 of plate 45. It should be noted that lead 49 is insulated and extended downward from the disperser in order that it will not effect droplet formation. Each opening 46 is adapted for receiving a separate capillary nozzle 31 by means of a neoprene gasket 55 which holds nozzles 31 centered in openings 46. Also, gasket 55 seals disperser 29 so that only the tips of nozzles 31 are immersed into the organic dry liquid, see FIGURE 1, in the vicinity of ground wires 47 which are located coaxially with the nozzles, proximate to the tips. Nozzles 31 are adapted by means of couplers 57, of which only two are shown, for connection to the common sol reservoir 32 (FIGURE 1) through an appropriate insulated tubing network 59.

In operation, the organic liquid circulating system is started, and an aqueous sol such as thoria, urania, plutonia, zirconia, and the like, or mixtures thereof, is pumped through flow regulator 37 into the sol reservoir 32 wherein a positive charge is applied to the sol by means of electrode 41. The positively charged sol then flows through conduit 33 into the tubing network 59 of disperser 29. As the sol passes through nozzles 31 at a preselected rate, the impressed voltage from voltage supply 39 is adjusted until microdroplets are dispersed into the drop forming and gelling liquid of column 5.

Figure 3:
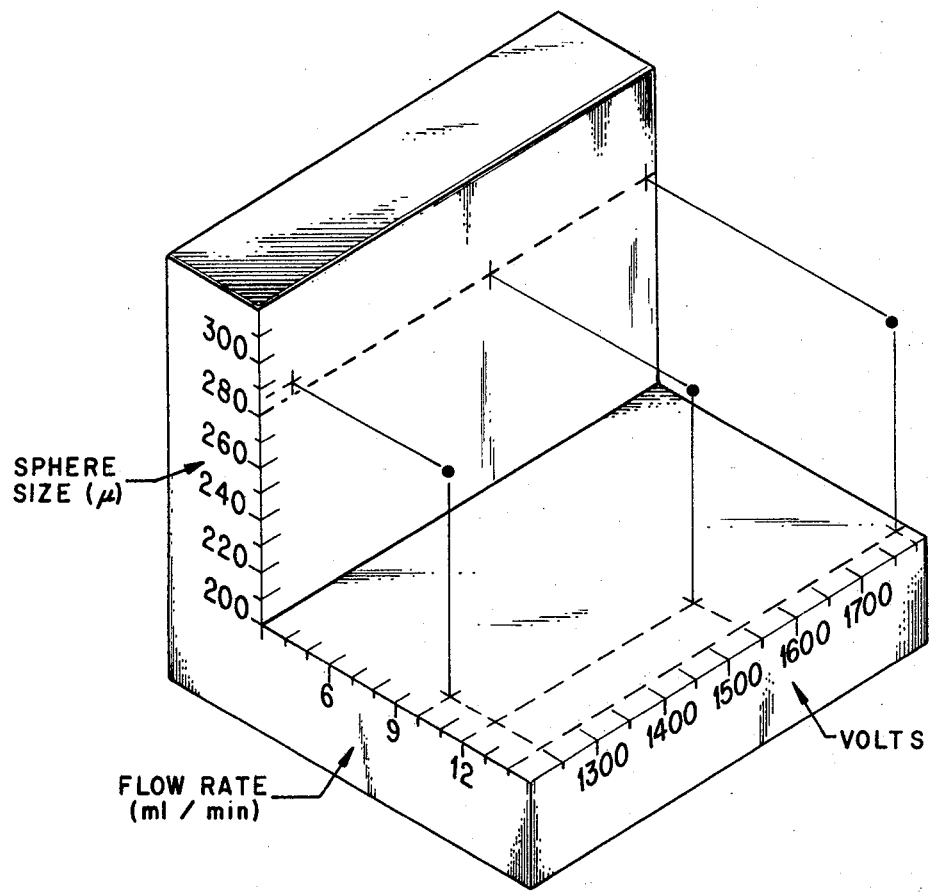
FIGURES 3 and 4 are three dimensional graphs showing sphere sizes produced by the present process for various flow rates and applied voltages.

It has been found that the drop size can be controlled by varying the sol flow rate and the impressed voltage. Visual observations show that an optimum flow rate is reached at which the drop size can be controlled by adjusting the impressed voltage. Increasing the voltage after this optimum flow is exceeded produces secondary droplets from the thin tail of the parent drop, adding appreciably to the production of fines which fall out in the collection chamber 15 or are flushed out by the effluent drying liquid and deposited on filter 21. These dependencies are illustrated in FIGURE 3 which depicts data obtained with the seven-nozzle disperser shown in FIGURE 2. The nozzles used were 10-mil-I.D., stainless steel tubes, and the sol used was a 1.5-mole thoria ($ThO_2$). The flow rate of sol was operated in the range of 10–14 milliliters per minute with the impressed voltage adjusted to yield particle sizes of 80% within the range of 280±80 microns. The voltage required in this case was 1250–1785 volts, depending upon the flow rate. As shown in FIGURE 3, the sphere size can be controlled at various flow rates by corresponding variations in the impressed voltage.

To complete the process operation, the gel microspheres which collect at the bottom of the forming column are removed by draining off a portion of organic liquid through valved line 17 into chamber 15. Then the spheres are filtered out and dried under mild conditions to remove the bulk of the water and adhering organic liquid prior to calcination. The dried microspheres are then fired to obtain the high density and strength required for reactor fuel element applications.

It should be noted that the organic liquid used to extract water from the sol droplets forms no part of this invention, except that the liquid has moderate solubility for water in order to act as a drying agent to effect gellation of the dispersed microspheres. It has generally been found that the long-chained alcohols, such as 2-ethylhexanol and 2-methylpentanol, are quite satisfactory as water-removal media. It also has been found that a surfactant, such as "Ethomeen S-15," is quite satisfactory in the preparation, for example, of thoria microspheres to prevent coalescence or agglomeration of the sol droplets with each other or on the column walls. It should be noted here that, in the foregoing discussion, only D.C. potentials are used. However, it has been found that 60-cycle A.C. potentials also work when impressed across the dispersed sol.

Having thus described the present invention in a general fashion, the following examples are provided to illustrate the quantitative aspects and procedures in greater detail.

*Example I*

An experiment was performed to determine the effect on particle size by varying the potential, with the flow rate held constant at each of two flow rates, and where the fraction of product particle size range specified at 80%. A nitrate-stabilized thoria sol 2.0 mole in $ThO_2$ was forced through a capillary nozzle of 10 millimeters diameter having a tip machined to a rounded contour and polished to a smooth surface. The ground electrode was a wire loop insulated from the nozzle and fixed approximately one inch from the nozzle tip. The gelling liquid was 2-ethylhexanol with 0.5 volume percent "Ethomeen S-15" (a tertiary amine surfactant) contained in a 1.75-inch-diameter forming column 21 inches high. The nozzle was immersed below the surface of the gelling liquid with the tip aimed in a downward direction. Although less than 500 volts were required to produce a noticeable dispersing effect, the applied voltage was varied between 500 and 1000 volts D.C. for rates of flow of 0.2 and 0.5 milliliter per minute. The effect of applied voltage on the particle size at these flow rates from a single nozzle of 10 mil I.D. is shown in Table I.

TABLE I

| Applied Voltage | 80% Within Particle Diameter Range (Microns) | |
|---|---|---|
| | Flow Rate, 0.2 ml./min. | Flow Rate, 0.5 ml./min. |
| 500 | 230±55 | 325±55 |
| 750 | 185±70 | 280±50 |
| 1,000 | 72±36 | 195±80 |

*Example II*

A similar experiment was performed using a higher range of applied voltages and a forming column of 12 liters' capacity. The fraction of particle size range was specified at 90 percent. The results are shown in Table II.

TABLE II

| Applied Voltage | Flow Rate (ml./min.) | 90% Within Particle Diameter Range (microns) |
|---|---|---|
| 570 | 0.2 | 290±60 |
| 700 | 0.5 | 345±45 |
| 1,000 | 1.2 | 410±60 |

*Example III*

An experiment was performed to test the feasibility of scaling up the rate of produced gelled thoria microspheres by the present method using a 15-nozzle disperser of the configuration shown in FIGURE 2. The disperser system having 15 stainless steel nozzles of 12 mil I.D. was fabricated. The positive electrode from the variable voltage supply 39 was immersed in the sol reservoir and the ground electrodes, consisting of copper rings, were placed concentric with the nozzle tip, and the entire assembly was molded in Lucite.

Operating characteristics of the multiple-nozzle device were determined in the laboratory. At a flow rate of 10 milliliters per minute of 2.0 mole thoria sol through the system, approximately 750 volts were needed to produce a stream of microdroplets of 300- to 350-micron size. The electrical current flow was 1.0 milliamp at 1200 volts when the apparatus was immersed in 2-ethyl-1-hexanol drying liquid with positively charged thoria sol being dispersed.

A series of experiments were then made in a 12-liter-capacity sphere forming column with the multiple-nozzle assembly.

Figure 4:
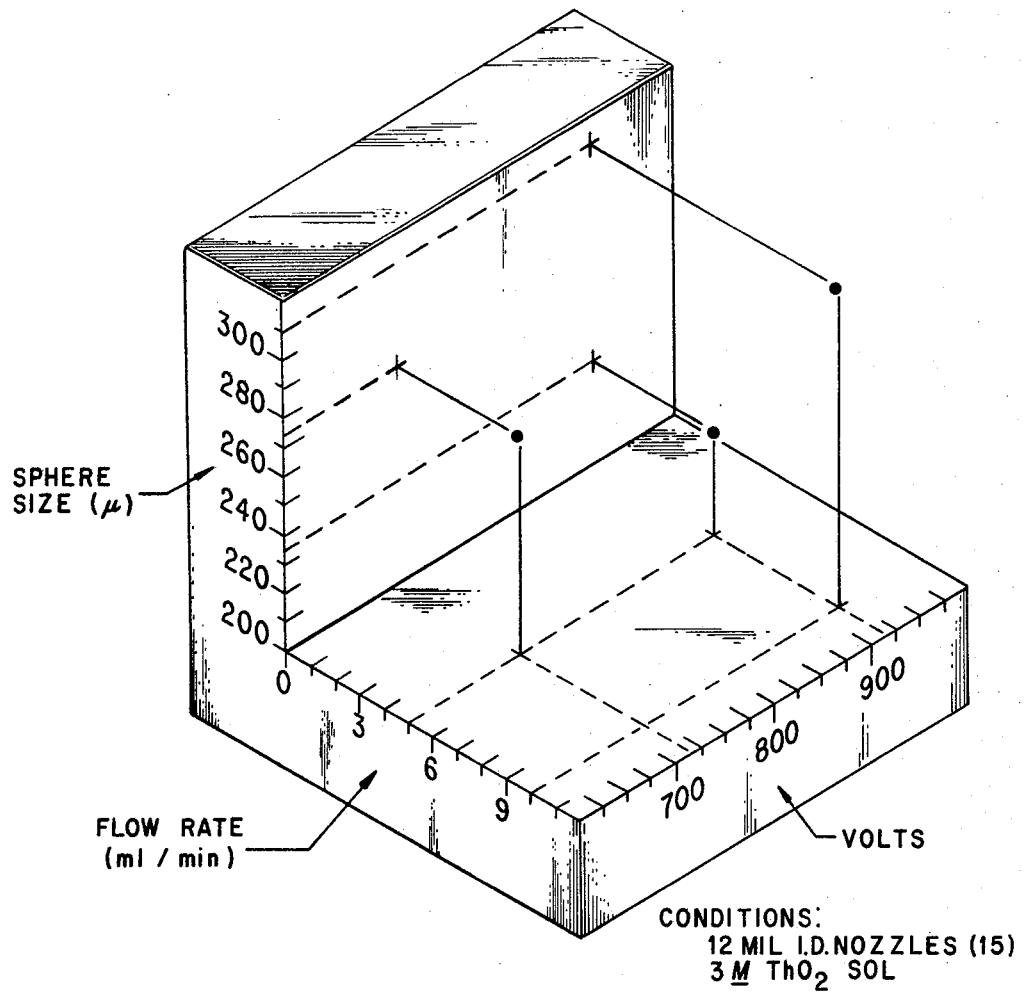

A potential gradiant across the stream of sol was maintained at a sufficient level to give single streams of droplets from all nozzles. Lengths of runs were for 60 minutes. The results obtained are shown in FIGURE 4. For example, 90% of the mass of spheres at flow rates of 5 and 10 milliliters per minute and using a potential of 915 volts were 235±55 and 310±34 microns, respectively.

The above examples are merely illustrative and are not to be understood as limiting the scope of this invention which is limited only by the appended claims forming a part of this specification.

What is claimed is:

1. In a method of forming gel microspheres by introducing a stream of an aqueous sol selected from the group consisting of thoria, urania, plutonia, and zirconia into a drying liquid, the improvement comprising establishing an electrical field with an applied voltage in the range of 500 to 2000 volts and passing a thin stream of said sol at a flow rate of between 0.2–1.2 milliliters per minute through said electrical field as it is introduced into said drying liquid thereby forming sol droplets of a size from 50–500 microns.

2. The method of claim 1 wherein said aqueous sol is about 2 moles thoria.

References Cited
UNITED STATES PATENTS

| | | | |
|---|---|---|---|
| 2,323,025 | 6/1943 | Formhals | 264—10 |
| 3,160,686 | 12/1964 | Doyle et al. | 264—10 |
| 3,290,122 | 12/1966 | Clinton et al. | 264—.5 |
| 3,313,602 | 4/1967 | Smith et al. | 264—.5 |

L. DEWAYNE RUTLEDGE, *Primary Examiner.*